United States Patent [19]

Mosher

[11] Patent Number: 4,551,058
[45] Date of Patent: Nov. 5, 1985

[54] LOW COST ARTICULATING/ARTICULATING AND ROTATING WRIST MECHANISM FOR AUTOMATIC MACHINE TOOL AND AUTOMATIC MACHINE TOOL EMPLOYING THE SAME

[75] Inventor: Ralph S. Mosher, Clifton Park, N.Y.

[73] Assignee: Robotics, Inc., Ballston Spa, N.Y.

[21] Appl. No.: 515,467

[22] Filed: Jul. 20, 1983

[51] Int. Cl.⁴ ............................................. B25J 17/02
[52] U.S. Cl. .................................... 414/735; 901/29; 414/738; 414/917
[58] Field of Search ............... 414/917, 735, 732, 730; 901/29

[56] References Cited

U.S. PATENT DOCUMENTS

| | | | |
|---|---|---|---|
| 3,543,910 | 12/1970 | Devol et al. | 198/34 |
| 4,042,122 | 8/1977 | Espy et al. | 214/1 CM |
| 4,234,150 | 11/1980 | Mee | 248/281.1 |
| 4,290,239 | 9/1981 | Zimmer | 51/126 |
| 4,329,110 | 5/1982 | Schmid | 414/730 |
| 4,329,111 | 5/1982 | Schmid | 414/733 |
| 4,353,677 | 10/1982 | Susnjara et al. | 414/735 |
| 4,367,998 | 1/1983 | Causer | 414/4 |
| 4,453,883 | 6/1984 | Bisiach | 414/917 |

FOREIGN PATENT DOCUMENTS 2460762  3/1981  France ............................... 414/917

*Primary Examiner*—Terrance L. Siemens
*Attorney, Agent, or Firm*—Charles W. Helzer

[57] ABSTRACT

A simple, low mass, low cost, articulating/articulating and rotating wrist assembly for use on automatic machine tools to provide two important degrees of freedom of movement of an end effector tool in the form of an articulating motion either alone or in conjunction with a rotating motion. Where both rotation and articulation are used the sequence is important in order to obtain new and different movements of the end effector tool for transcribing cones, etc. The fundamental articulating motion is achieved through the kinematics of a primary, parallelogram-type pantograph driven remotely from the automatic machine tool and employing a secondary restraining mechanism either in the form of a secondary parallelogram-type restraining pantograph or a cluster of sun, idler and planet gears. The wrist assembly can be used in conjunction with any of the known automatic placement machine tools whether operable only along a single dimensional axis, within a plane defined by two orthogonal axes or a three dimensional space. The configurations and relative size and length and location of the linkages comprising the pantograph are dictated by the particular amplitude and sector of motions in space that are required for any given application for which the wrist mechanism is designed and the kind of scribing movement of the working tool desired.

24 Claims, 15 Drawing Figures

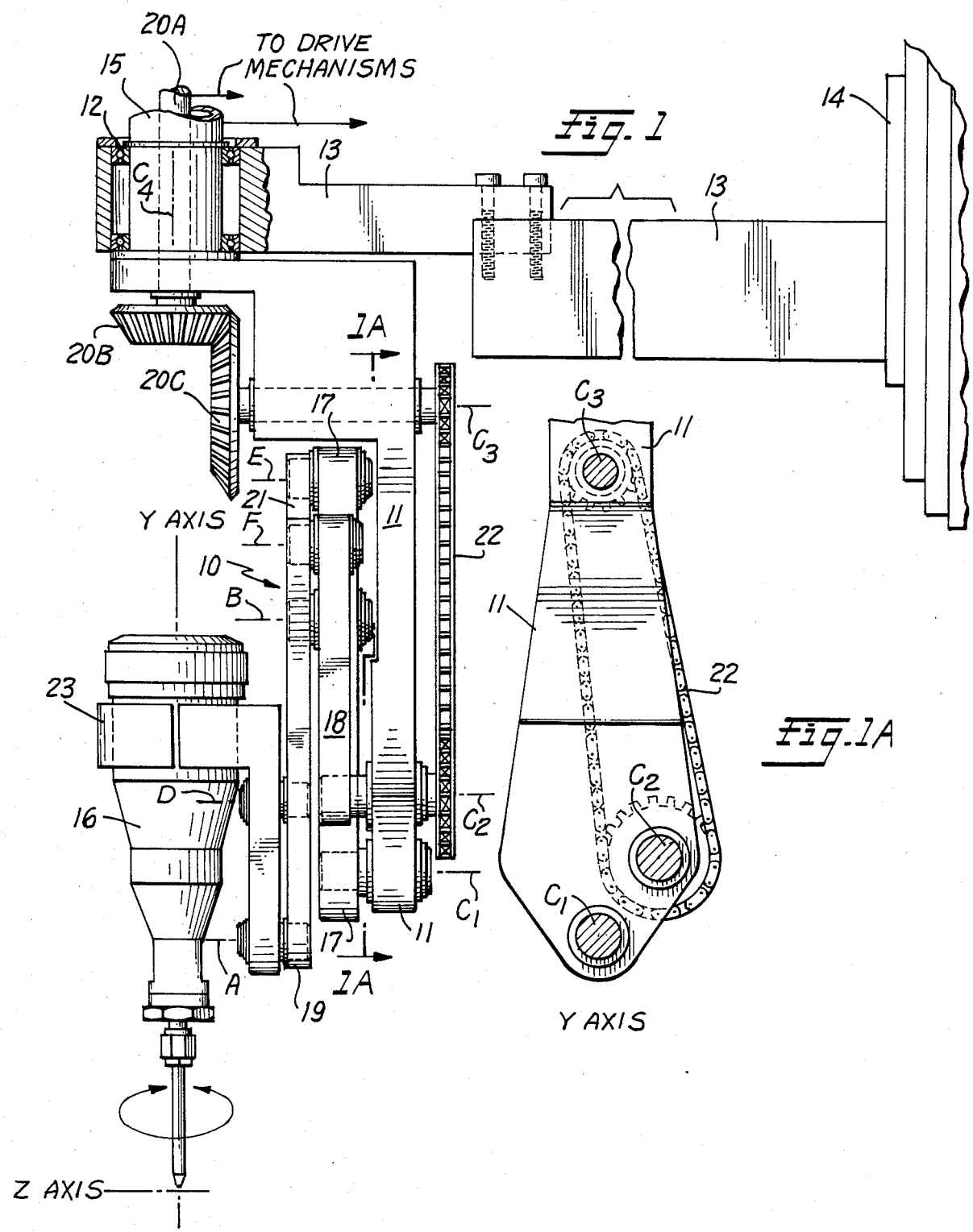

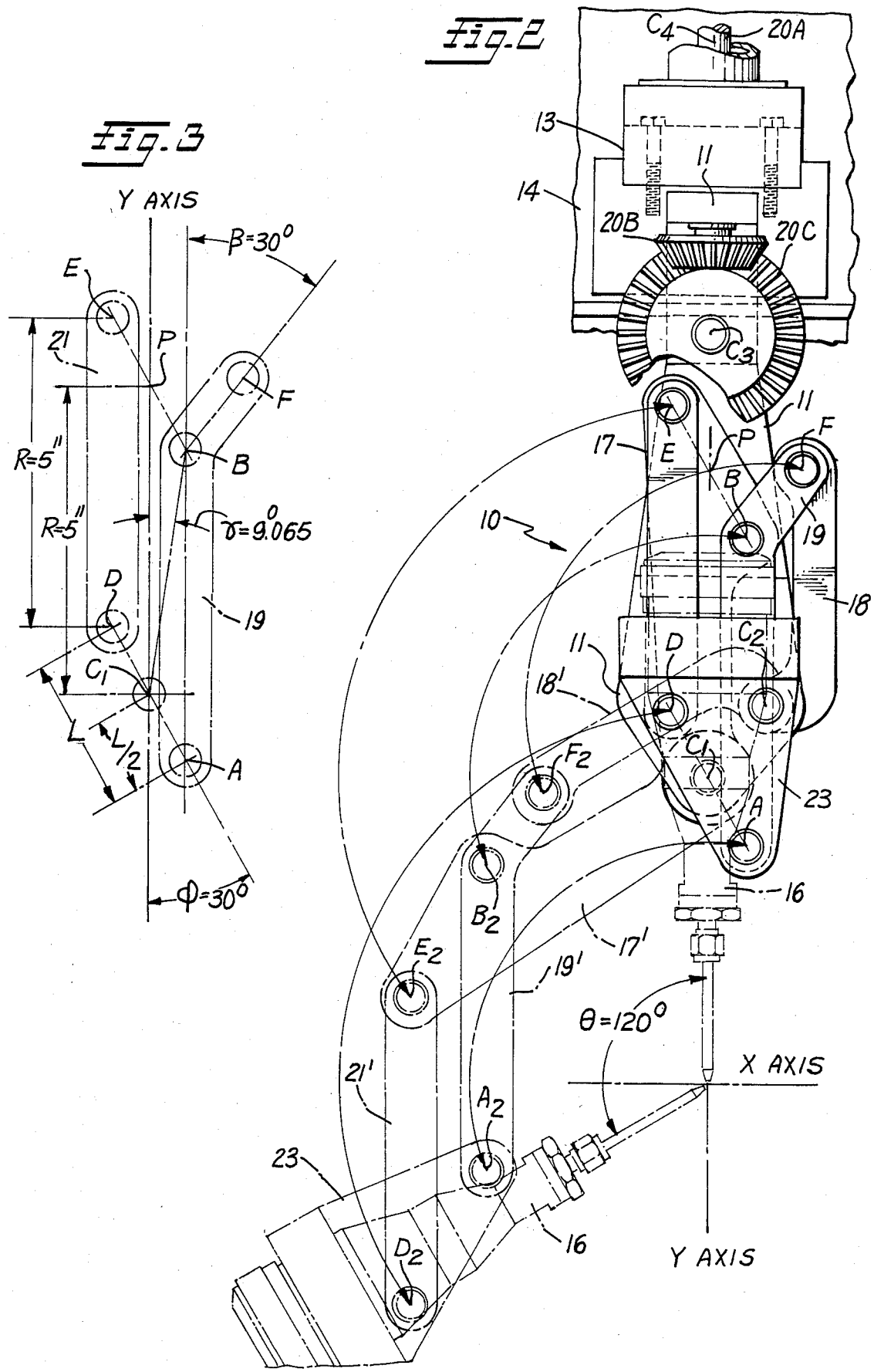

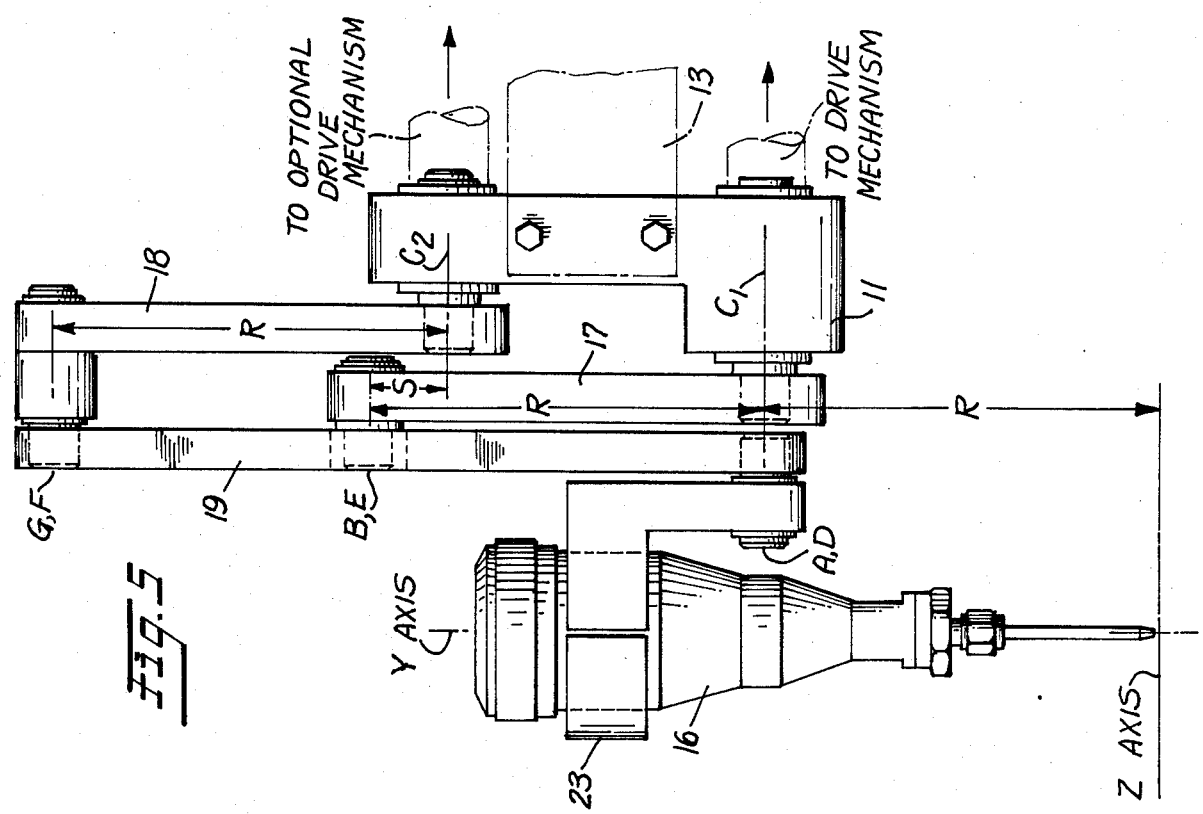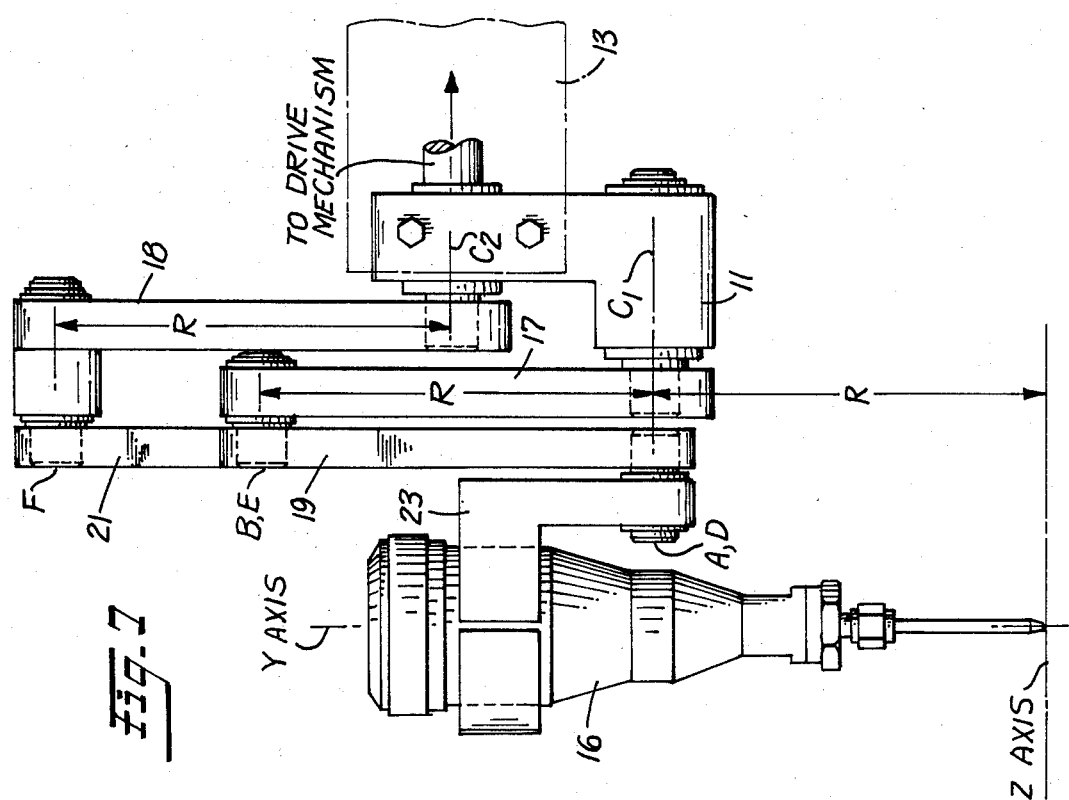

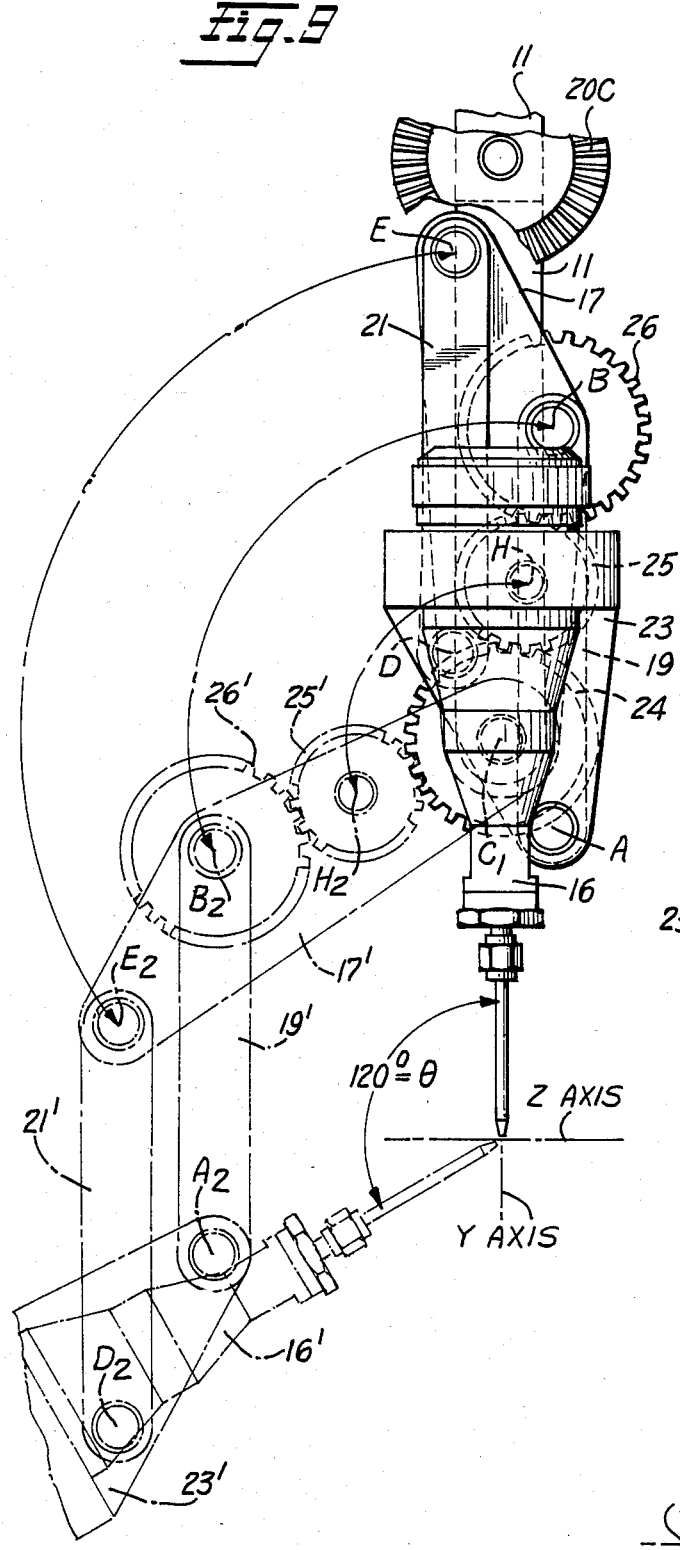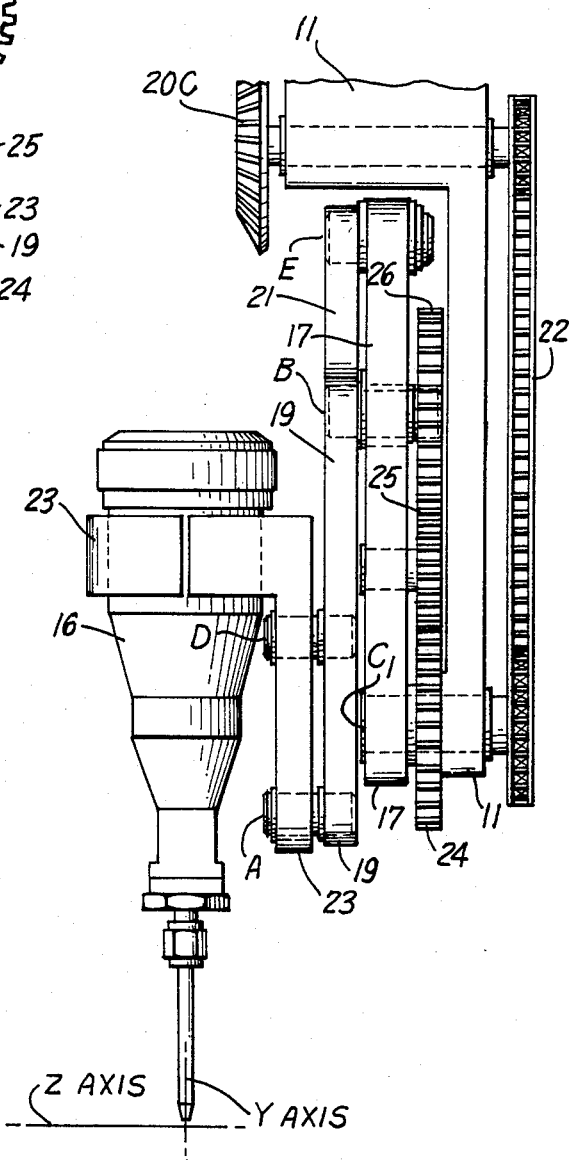

LOW COST ARTICULATING/ARTICULATING AND ROTATING WRIST MECHANISM FOR AUTOMATIC MACHINE TOOL AND AUTOMATIC MACHINE TOOL EMPLOYING THE SAME

TECHNICAL FIELD

This invention relates to a new and improved wrist mechanism for automatic machine tools including robots which is relatively simple and inexpensive in design and manufacture, and yet sufficiently dexterous and precise to satisfy most job requirements, and to automatic machine tools employing the same.

More specifically, the invention relates to a new articulating/articulating and rotating wrist mechanism which can be built integrally with an automatic machine tool capable of automatic movement along a single axis of movement, along two orthogonal axes of movement within a two dimensional plane or three dimensionally along three orthogonal axes of movement. Alternatively, the new wrist mechanism can be manufactured separately and added to existing automatic machine tools to provide them with an additional ability to orient an end effector tool to get into restricted and difficult to access areas.

BACKGROUND PRIOR ART

An article appearing in the "ROBOTICS AGE" magazine, November/December 1982 issue entitled "Robot Wrist Actuators" pages 15-19 summarizes the state of development of wrist mechanisms for robots and other similar automatic machine tools. This article includes a bibliography listing of a number of prior art United States and foreign patents as well as published articles concerning wrist mechanisms. As noted in the first two paragraphs of this article, it is stated that the wrist actuator takes ninety percent of the creativity of the mechanical design of the industrial robot. It is further stated that the ideal wrist is one which is compact, powerful, dexterous and precise. It is further stated that most robots used in welding, material handling, paint spraying, assembly, and working in cramped spaces or performing complex maneuvers would benefit from improved wrist design.

The article further describes a number of known wrist designs and in particular the wrist mechanism employed on the Cincinnatti Milacron-Roll wrist as described on page 10 of the article. The wrist design there disclosed is quite complex, heavy and expensive. This is due to the fact that for manipulator work, one of the big requirements is load capacity and because of that the wrist is made quite large and heavy. It is also designed to provide for three dimensional articulation and hence complex. However, many applications for wrist mechanisms do not need the kind of capacity and dexterity that is built into the design of the three dimensional prior art wrist actuators such as are described in the above-noted article. For example, gas torch cutting, spray painting, welding, brazing, dispensing on mastic material and perhaps even space robot work do not require large load handling capability and could instead use a manipulator that is light weight, simple in design and relatively low cost but sufficiently dexterous and precise for many job applications. Such a manipulator also could be used in machine shops employing NC machines which are capable of moving a tool holding member selectively along one axis of movement, two orthogonal axes of movement within a plane, or three orthogonally arrayed axes of movement for three dimensional positioning. There is a further possibility of need in the medical field for positioning x-ray guns and the like where a simple, light weight, less expensive wrist mechanism can do the job satisfactorily without requiring the large load carrying capability or additional degrees of movement designed into the existing wrist actuators as depicted in the above-noted article.

SUMMARY OF INVENTION

It is therefore a primary object of the present invention to provide a new and improved, simple, relatively low cost wrist mechanism for articulating an end effector tool and which is light weight and relatively small in mass so that it can rotate the end effector tool around a single point or axis displaced away from the automatic machine tool which drives the wrist mechanism. The improved wrist mechanism includes the needed ability to orient the end effector tool to allow it to get into restricted and difficult to access areas around a workpiece being worked upon while minimizing weight so that at high speed the wrist mechanism and attached end effector tool will have less effect in creating unwanted vibrations and load on the driving parts of the automatic machine tool.

Another object of the invention is to provide an improved wrist mechanism having the above set forth characteristics which can cause an end effector tool to articulate about a point in space displaced from the automatic machine tool which drives it without causing a divergence in the required pattern of motion on the part of the automatic machine tool driving the wrist mechanism and end effector tool. For example, should the articulation provided by the wrist mechanism be a swing forward of the end effector tool, as the total automatic machine tool is moving in a forward direction, then to keep a constant speed or proper direction, known wrist mechanisms require that other base motions of the automatic machine tool be adjusted through computer control to compensate for the necessary secondary motion imparted by the requirement for articulation. The present invention obviates the need for these adjustments to the base motions of the automatic machine tool to compensate for movements of the articulating wrist mechanism.

A further object of the invention is to provide an improved, linkage driven wrist mechanism having two important degrees of freedom for movement. The wrist mechanism according to the invention can provide either an articulating motion or a combined rotational and articulating motion where the sequence is important in order to achieve complex and difficult to attain shapes with the end of the end effector tool supported on the wrist mechanism. The design is such that the power and sensing equipment, which normally is large and heavy, can be located on the frame of the main automatic machine tool which supports and drives the wrist mechanism, and the necessary drive and sensing to the wrist mechanism can be transmitted efficiently through light weight coupling elements to the end effector tool via the improved wrist mechanism. It is important to note that the sequence of motions is first: rotation; second: articulation. This provides the ability to generate a cone with the longitudinal axis of the end effector. This is a valuable motion. This is in contrast to the prior art wrist articulators noted above all of which are designed to provide for three degrees of freedom. In the present invention the additional complexity, weight and mass required to provide the unnecessary additional degrees of freedom are obviated in view of the fact that the improved wrist mechanism is designed for particular jobs where only one or the other or both degrees of freedom mentioned above are required.

In practicing the invention a simple, low cost articulating wrist is provided for an automatic machine tool. The articulating wrist comprises a primary parallelogram-type pantograph mechanism for holding an end effector tool and rotatable in an x-y plane about a first axis that intersects the x-y plane of rotation of the pantograph mechanism. Drive means are provided for rotating the primary pantograph mechanism within the x-y plane about the first axis to thereby rotate the working end of the end effector tool about a second axis also intersecting the x-y plane of rotation of the primary pantograph mechanism and displaced from the first axis of rotation. Secondary restraining means are coupled to the primary pantograph mechanism and rotatable therewith for forcing the links of the primary pantograph mechanism to be restricted to pure rotation about the first axis within the x-y plane whereby the two parallel links of the primary pantograph mechanism are caused to maintain a fixed orientation with respect to the x-y axes of the x-y plane within which the mechanism moves.

The end effector tool is secured to a member rotatably mounted to respective ends of the two parallel links of the primary pantograph mechanism which are caused to maintain a fixed orientation with respect to the x-y axes of the x-y plane within which the primary pantograph moves whereby rotation of the primary pantograph mechanism about the first axis in the x-y plane of movement results in articulation of the end effector tool about the displaced second axis within the x-y plane of movement.

In a preferred embodiment of the invention, an articulating and rotating wrist assembly is provided according to the invention which further includes a base member on which the primary pantograph mechanism is rotatably supported together with the drive means and the secondary restraining means and further includes means for rotating the base member about one of the x-y axes. The arrangement must be such that the axis of rotation of the base member is coaxial with the end of the end effector tool, or the selected x-y axes intersection.

In one embodiment of the invention, the secondary restraining means comprises a secondary parallelogram-type pantograph mechanism coupled to the primary pantograph mechanism and rotatable therewith.

In a second embodiment of the invention, the secondary restraining means is a cluster assembly of sun, idler and planet gears. Idler and planet gears are rotatably supported on one of the members (17) of the primary pantograph mechanism other than those to which the end effector tool is secured with the sun gear being coaxial with a drive shaft for the mechanism, and fixed to base part 11. (Shaft C rotates free of sun gear.) The planet gear is coaxial with and rotatably secured to a rotational axis of one of the parallel links of the primary pantograph mechanism to which the end effector tool is secured.

The new and improved articulating/articulating and rotating wrist assembly may be mounted upon and comprise a part of an automatic machine tool providing for automatic placement of the end effector tool along a single axis or within an x-y plane or within a three dimensional space, and wherein an articulating wrist according to the invention is mounted on the end of the movable tool placement member comprising a part of the automatic machine tool.

BRIEF DESCRIPTION OF DRAWINGS

These and other objects, features and many of the attendant advantages of this invention will be appreciated more readily as the same becomes better understood from a reading of the following detailed description, when considered in connection with the accompanying drawings, wherein like parts in each of the several figures are identified by the same reference characters, and wherein:

FIG. 1 is a side elevational view, partially broken away, of an articulating and rotating wrist according to the invention whereby the wrist rotates an end effector tool and the y-axis and simultaneously or independently articulates the end effector tool in an x-y plane which extends into the plane of FIG. 1 as viewed by the reader. The x-y plane rotates about the y axis and is fixed relative to wrist base member 11 which planar top surface is shown in FIG. 1A. End effector articulation in the x-y plane caused by wrist rotate action is over ridden by articulation drive shaft 20A;

FIG. 2 is a top, planar, elevational view of the articulating and rotating wrist assembly shown in FIG. 1 and illustrates in greater detail the construction of the articulating wrist and the manner of its operation;

FIG. 3 is a schematic diagram of the links of a primary parallelogram-type pantograph mechanism comprising a part of the wrist shown in FIGS. 1 and 2;

FIG. 5 is a side elevational view of the embodiment of the invention shown in FIG. 4;

FIG. 7 is a side elevatonal view of the embodiment of the invention shown in FIG. 6;

FIG. 9 is a top plan elevational view of still another embodiment of the invention which employs a sun, idler and planet gear assembly as the restraining means for the primary pantograph mechanism comprising a part of the articulating wrist assembly;

FIG. 10 is a side elevational view of the embodiment of the invention shown in FIG. 9;

BEST MODE OF PRACTICING THE INVENTION

Figure 3A:
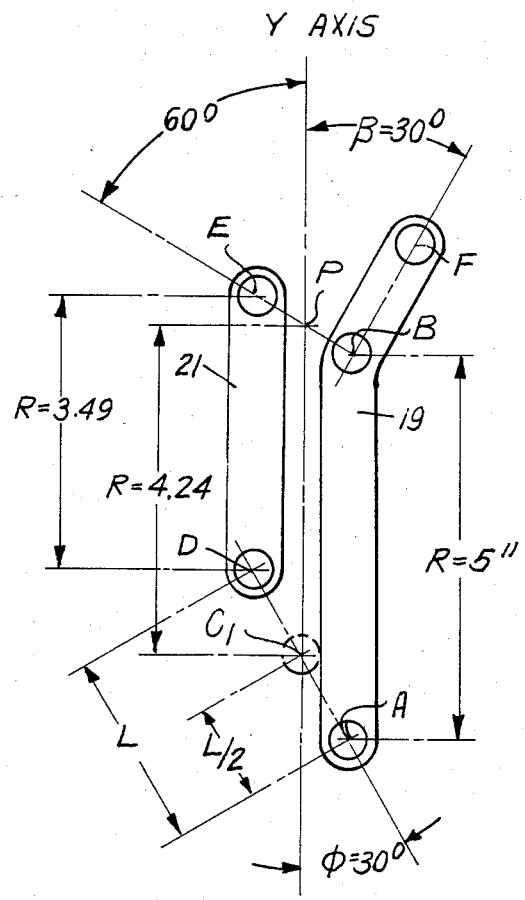
FIG. 3A and FIG. 2A show a mechanism which employs pantograph linkages of unequal length.

FIG. 1 is a side elevational view, partially broken away of an articulating and rotating wrist assembly shown generally at 10 and built according to the invention. The wrist assembly can rotate an end effector tool 16 about the y-axis shown and simultaneously or independently articulates the end effector tool about the chosen axes intersection and within the x-y plane which in turn is rotatable about the y axis (and fixed orientation with respect to wrist base member 11). FIG. 2 of the drawings is a top planar elevational view of the wrist shown in FIG. 1 and better illustrates the articulating nature of the wrist. From FIG. 1 it will be seen that the wrist assembly is supported on a base member 11 which is essentially L-shaped in side elevation and is supported by roller bearings 12 on the end of a boom 13 or other working member of an automatic machine tool shown at 14. The automatic machine tool 14 may comprise a simple, single axis of movement automatic positioning machine. Preferably, however, machine tool 14 comprises either a planar "SHAPEMAKER" of the type described in U.S. Pat. No. 4,155,272 issued May 22, 1979 for a "Low Cost Cam Controlled Positioning Apparatus"—Ralph S. Mosher, inventor—assigned to Robotics, Incorporated of Ballston Spa, New York, or alternatively, may comprise a three-dimensional positioning machine of the type described in U.S. Pat. No. 4,306,464 issued Dec. 22, 1981 for a "Multi-Directional Mechanical Positioning Apparatus"—Ralph S. Mosher, inventor—assigned to Robotics, Incorporated of Ballston Spa, New York, or a numerical control machine of the type known to the trade by the term PROGRAM-A-SPENSER. Other similar automatic positioning apparatus for positioning the boom 13 at any point along a single axis, within a two dimensional plane, or within a three dimensional volume of space, could be used. The wrist assembly according to the invention, shown generally at 10 may be integrally built with such automatic machine tools when the tools are initially built, or alternatively may be added to such automatic machine tools subsequent to their manufacture in order to give them additional dexterity and capability.

The wrist base member 11 is welded or otherwise secured to a hollow drive shaft 15 which in turn is mechanically coupled to and driven by suitable drive couplings in the form of flexible shafts, cables, chains or the like and which are driven by computer controlled drive motors (not shown) mounted on or included within the automatic machine tool 14. The hollow drive shaft 15 is rotatably supported within the roller bearings 12 and when driven causes the wrist base member 11 to be rotated about its central axis which is coincident with the intersection of the base axes as shown in FIG. 1. In this particular example, the axis about which the wrist base member 11 is rotated happens to be the y axis. It is believed obvious to one or ordinary skill in the art that by a similar expedient, the wrist base member 11 could be caused to rotate about the x axis for any application of the wrist where such motion would be required. Additionally, in the examples herein described the end effector tool happens to be a mastic dispenser 16. It is believed obvious to those skilled in the art that any form of working tool such as gas torch cutting, welding, spray painting, brazing, x-ray machine scannings, and the like, could be employed in place of a mastic dispenser as the end effector tool.

The articulating portion of the new and improved wrist is comprised by a primary, parallelogram-type pantograph mechanism consisting of links 19 and 21 whose configuration and pivotal interconnection can best be seen in FIG. 2. The wrist further comprises a restraining means for the primary pantograph mechanism 19 and 21 which consists of a secondary pantograph mechanism comprised by links 17 and 18 also best shown in FIG. 2. The articulating wrist further consists of drive means for driving the primary pantograph mechanism 19, 21 via either of the two rotatable shafts C1 or C2 either or both of which can be rotated through a chain drive 22 as shown in FIGS. 1 and 1A. Chain 22 is driven by shaft C3 via a central drive shaft 20A and bevel gears 20B and 20C with the central shaft being coupled back to a computer controlled drive motor (not shown) mounted within the automatic machine tool 14. If desired, a similar drive can be provided for the shaft C1. Shaft C1 locked to link 17, and shaft C2 locked to link 18 dictate synchronous rotation of shafts C1 and C2. Pantograph links 17 and 18 remain parallel to each other which forces synchronism of shafts C1 and C2. Thus, the articulating wrist portion can be driven by rotating either or both of shafts C1 and C2 to which links 17 and 18 are respectively fixed. These two links have rotational axes B, E and F thereon to which the primary pantograph links 19 and 21 are rotatably secured. Thus rotation of shafts C1 and C2 causes pivoting of the links 17, 18, 19 and 21 from the solid line position shown in FIG. 2 to the broken line position 17', 18', 19', 21' or to any intermediate position as determined by the degree of rotation of shafts C1 and C2. A holder 23 for the end effector tool 16 is rotatably secured to axes A and D at the free ends of the primary pantograph links 19 and 21 respectively, as best seen in FIG. 2. Thus, upon C1 and/or C2 rotating links 17 and/or 18 upwardly from their initial at-rest position shown in solid lines in FIG. 2, the end effector tool 16 which is rotatably secured through mounting member 23 to the ends A and D of the primary pantograph links 19 and 21, will be caused to articulate about an axis normal to the x-y plane which intersects the x-y plane of movement of the articulating pantograph mechanism and which is displaced from the axes of rotation C1 and/or C2 of the pantograph mechanism. As shown in FIG. 2, the articulation takes place through an arc of $\theta = 120°$. The mechanism also will articulate the end effector tool 16 through a similar arc in the negative direction, that is $\theta = -120°$ in a manner similar to that shown in FIG. 4 of the drawings.

The primary parallelogram-type pantograph that provides for the ability to rotate the end effector tool 16 about an axis displaced from the axis of rotation of the pantograph itself, is illustrated in the sketch shown in FIG. 3 together with certain critical dimensional relationships which must be maintained for the particular articulating wrist mechanism design illustrated in FIGS. 1 and 2 to operate properly. The primary pantograph is defined by the axes A, B, D and E. This primary pantograph is driven by the driver link 18 which is fixed to shaft C2 and rotates therewith. Rotation of driver link 18 requires that the rotatable axes B and E of the primary pantograph maintain a fixed distance from each other at all positions and to scribe arcs of circles about axes C1, C2. At this point in the discussion, it should be remembered that a conventional parallelogram has freedom of rotation of the links such as 19 and 21 about axes such as B and E, if not restrained. Such motion for the application here in mind would be undesirable so that a restraining means is employed to prevent rotation of the links 19 and 21 in an undesirable fashion.

The restraining means shown in FIG. 2 comprises a secondary parallelogram-type pantograph which is defined by the rotational axes C2, C1, F and B. The relative position of the rotational axes C1 and C2 to each other are maintained fixed by their anchored positions to the wrist base member 11. The result is that the secondary pantograph acts as a restraining means so that it forces the two links 19 and 21 of the primary pantograph to maintain a fixed orientation with respect to the x-y axes of the plane of rotation within which the mechanism works. In other words, as shown clearly in FIG. 2, the links 19 and 21 are maintained parallel to the y axis at all times. With this combination of primary and secondary restraining pantographs, the points B and E (which are rotational axes on driver link 17) are forced to be restricted to pure rotation about the axis C1. In accordance with the geometric rules governing parallelograms, it follows that points A and D which rotationally support the end effector tool 16 must duplicate the motions of points B and E, respectively. Hence, the points A and D must rotate about the intersection point of the y and x axes in a manner which is a duplication of the rotation of points B and E about the C1 axis, but about an axis which is displaced in space away from the C1 axis.

From the above description, it is believed obvious that variations from the specific design shown are possible. In the embodiments of the invention described above and to be described hereafter, it will be appreciated that the relative position of the axis C2 with respect to the axis C1 are all different. However, in all three embodiments to be described, the axis C1 is located halfway between points A and D and on their common axes. However, this is not a requirement. Rotational axis C1 can be displaced in the x-y plane and the restraining of the primary pantograph relocated to the limit of practical linkage design. In other words, if rotational axis C1 were arbitrarily displaced in the x-y plane, then the linkage connection between points B-E would be forced to rotate about this new C1 axis. Then in accord with the geometric rules governing parallelograms, the end effector rotational point would be displaced similar to the displacement of axis C1. In this manner, one can achieve an effective off-set location of the end effector tool rotational axis relative to the wrist mechanism.

The drawing shown in FIG. 3 of the drawings, which is a sketch of the configuration of the primary pantograph links 19 and 21, has a set of geometric rules which govern the relative proportions of the interlinking elements of the mechanism for design purposes. These rules indicate that variations of the design are possible. However, for the mechanism to work, there are some essential proportions required. The primary proportion of importance is the dimension R shown in two places which must be maintained equal. The dimension L is the distance between pairs of rotational axes and is an arbitrary number, but must be the same for all pairs of rotational axes such as axes A-D and B-E. The remaining geometric rules governing design of the wrist mechanism are set forth in the below listing.

Geometric Rules for FIGS. 1-3

1. $\overarc{AD} = \overarc{BE}$; $\overarc{AB} = \overarc{DE}$ (Primary Parallelogram).
2. $\overarc{C1C2} = \overarc{BF}$; $\overarc{C1B} = \overarc{C2F}$ (Secondary Parallelogram)
3. R is an arbitrary constant (four places).
4. Common axis of A & D must intersect C1.
5. Common axis of B & E must intersect P.
6. Location of A & D to C1 must be the same as B & E are to P.
7. C4 axis coaxial with y axis.

Optimizing Relationships

| 8. | $\beta = \dfrac{180° - \theta}{2}$ |
|---|---|
| 9. | $\phi = \dfrac{180° - \theta}{2}$ |
| 10. | $\overarc{AC1} = \overarc{C1D}$ |

Note:
Indicated dimensions relate to constants chosen. Only R, r, L & $\theta$

11. Common axes to A & B, and D & E are parallel to the z axis.
12. All pivot axes (total mechanism) are perpendicular to the y axis, or x-y plane.
13. System can be canted with respect to x-y plane, (negating item 11 and 12).
14. Many other parallelogram sizes and relative locations to each other are possible.
15. Primary motion is about a single axis y.
16. Secondary motion is about a plane, intersecting the y axis.
17. The plane and y axis are not restricted to being orthogonal.

Figure 2A:
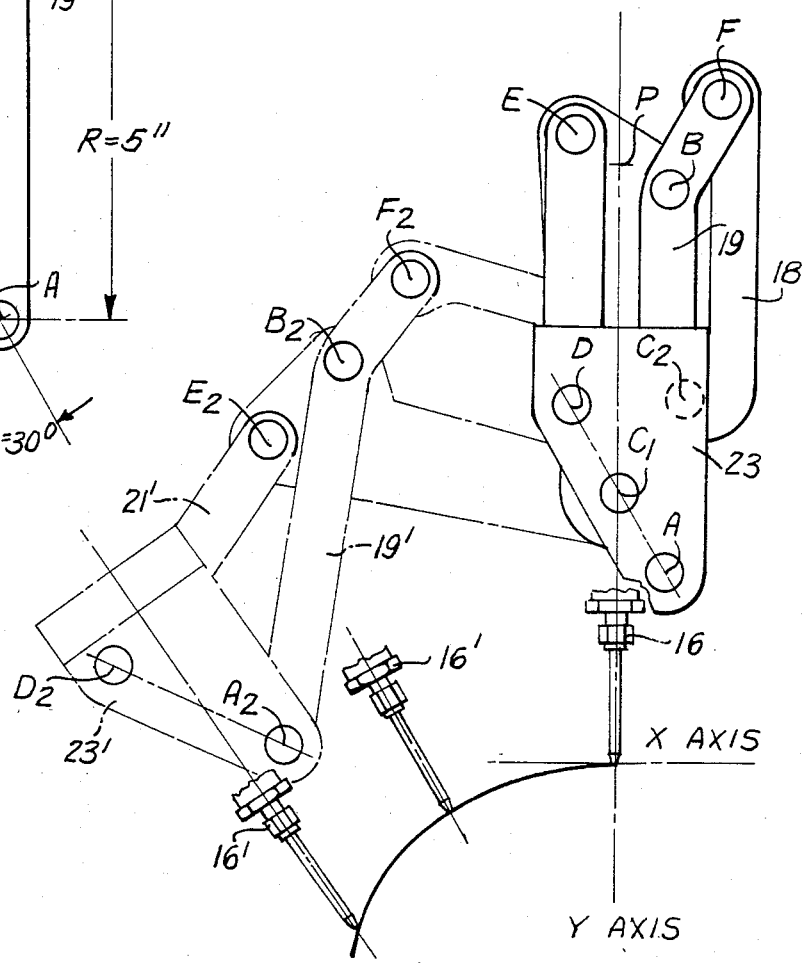

FIG. 3A and FIG. 2A of the drawings are simplified sketches illustrating a set of pantograph linkages 19 and 21 of unequal length whereby the end of the end effector tool is caused to scribe segmental arcs of figures other than a circle about the displaced axis in its path of movement while being articulated.

Figure 4:
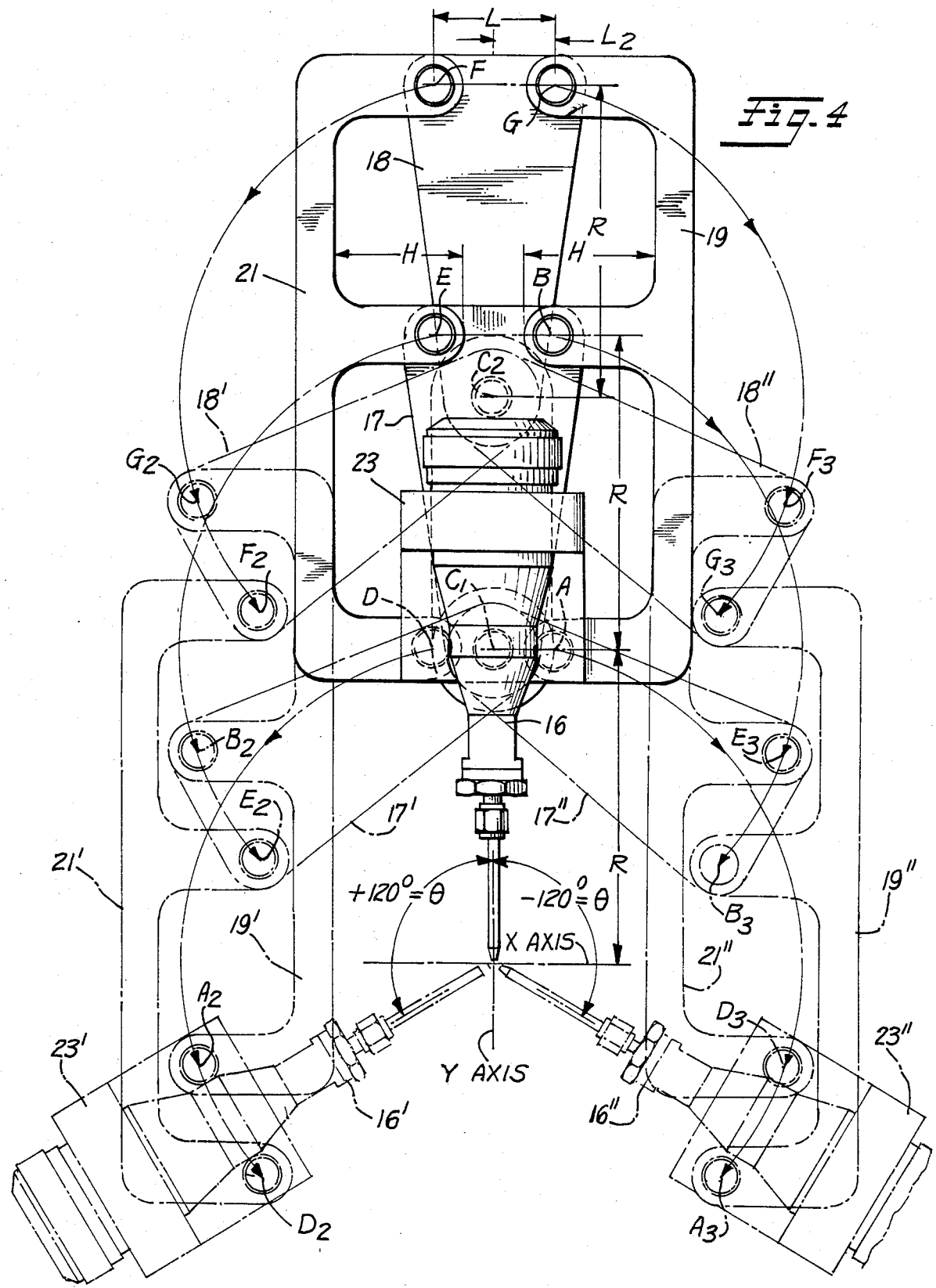
FIG. 4 is a top, planar elevational view of an alternative form of an articulating wrist constructed according to the invention suitable for heavier loads and which is capable of articulation 120 within the plane of the drawing of FIG. 4 as viewed by the reader.

The embodiment of the invention shown in FIG. 4 is designed for heavier loads and thus is stronger and somewhat more complex, bulkier and heavier than the embodiment of the invention shown in FIGS. 1-3. Additionally, it might be noted that in FIG. 4 only one degree of freedom of movement is illustrated, namely articulation of the wrist mechanism about a remote axis in space which intersects the plane of movement of the articulating wrist mechanism. It is believed obvious to one skilled in the art how to provide for rotation of the wrist mechanism shown in FIGS. 4 and 5. This can be done by the simple expedient of mounting the wrist base member 11 to a rotatable support on the boom or other driven member of the automatic machine tool shown at 13 in FIG. 5 in a manner similar to that described with relation to FIGS. 1-3.

As best seen in FIG. 5, the wrist base member 11 is secured directly on the boom or other movable member of an automatic machine tool (not shown) which is designed to move the wrist mechanism either linearly, in a plane, or in a three-dimensional space as described above with relation to FIGS. 1-3. In FIG. 5, it will be seen that both the rotational axes C1 and C2 are separately driven directly through drive mechanisms intercoupled through suitable coupling drive shafts with computer controlled drive motors (not shown) mounted on the automatic machine tool that drives boom 13. While in this embodiment both shafts C1 and C2 are being positively driven, either one or the other could be driven separately as with the FIGS. 1-3 mechanism. With either arrangement, it is necessary that both shafts rotate in synchronism.

As best seen in FIG. 4, the wrist is capable of articulating the end effector tool 16 through an arc of $\theta = +120°$ to the position shown at 16' or alternatively through an arc of $-120°$ to the position shown at 16" for a full excursion of 240°. Articulation in this manner is achieved by rotation of the shafts C1 and C2, which are rotated in synchronism. C1 and C2 are fixed to and cause triangular-shaped members 17 and 18 to be rotated in a corresponding manner. The triangular-shaped members 17 and 18 have rotational axes B, E and G, F, respectively, located thereon which are connected to respective end points on the legs of E-shaped links 19 and 21 which comprise the primary parallelogram-type pantograph mechanism forming the articulating wrist assembly. Pivoting of the triangular-shaped members 17 and 18 in response to rotational movement of the shafts C1 and C2, causes the E-shaped links 19 and 21 to move as a pantograph as indicated by the arcs of circle either to the positions shown at 16', 19', 21' or to 16", 19", 21", or to some intermediate position as required to perform a particular task. The two remaining legs of E-shaped links 19 and 21 have pivotal axes A and D thereon to which the holder 23 for end effector tool 16 is rotatably secured.

In operation, the articulating wrist mechanism shown in FIGS. 4 and 5 functions as essentially two pantographs working in unison so that the motions described by the rotational axes B, E and also G, F is repeated or followed by rotational axes A and D to which the end effector tool 16 is secured by means of tool holder 23. Rotational axes B, E circulate around fixed axis C1 and rotational axes G, F circulate around fixed axis C2 with the end effector axes A, D repeating this geometric pattern. This action in turn causes the tip of the working tool to rotate about a third axis displaced from the rotational axes C1, C2 and which intersects the plane of rotation of the wrist mechanism.

For the articulating wrist mechanism to work as described above, there are some essential proportions required. One of the primary proportions is the relative dimension R shown in three places in FIGS. 4 and 5. Another is that the triangular shapes of the members 17 and 18 be congruent. The two parallelogram-shaped pantographs which comprise the heart of the articulating wrist mechanism and provide the desired kinematic operation are comprised by C1, C2, E and F as the primary pantograph with the secondary restraining pantographs being formed between the four axes C1, C2, B and G. As indicated in the drawings, the dimension L is between these pair of axes and is an arbitrary number but must be the same for all three pairs of axes, that is A-D, B-E and G-F.

There are two key reasons why it is possible to get extensive excursion of the end effector tool through the articulating arcs $\theta$ as shown in the drawings without having an over-centered condition of the rotating member which would usually cause ambiguity or a lock-up of the mechanism. The first reason is that driving triangular part 17 is done essentially by two links C1-E and C1-B. Because of this arrangement, the links C2-F and C2-G are forced to follow or be driven through the same arcuate movement. The links 19 and 21 have been provided with an E-shape with three offset extensions or legs. These are noted as having a length or distance of H and this depth is determined by the amount of clearance needed with the links extended to their maximum $+$ or $-\theta = 120°$ intermeshed position.

There are variations of the design shown in FIGS. 4 and 5 which are possible and are believed to be obvious to one or ordinary skill in the art in the light of the above teachings. The following variations in design of the articulating wrist mechanism, are possible. For example, the wrist mechanism is not restricted to orthogonal movements only. By connecting C1 and C2 synchronously, it is possible to eliminate either G or F and/or also relocate G or F at another position on parts 19 and 21. It is also possible to go beyond $\theta = 120°$ to for example $\theta = 150°$ but in such an arrangement, constants and link shapes must be changed in accord with good design principles. To accommodate such a change, the dimension H would have to be greater so that there would be no conflict between parts 19 and 21. It also follows that for articulating motions $\theta$ less than 120°, then H can be less and therefore the package becomes more compact and lighter. Additionally, it should be noted that triangular part 18 is sandwiched in behind triangular part 17 in order to reduce the overall length of the articulating wrist mechanism. It is possible to achieve further reductions by reducing the size of the dimension R and thereby make a very compact wrist mechanism for special operations. It should be further noted that the orientation of the whole articulating wrist assembly is not committed to one position or plane of reference, but can be mounted in any orientation for the convenience of a particular job for which the machine is designed.

An important point relating to the design of FIGS. 4 and 5 as well as that of FIGS. 1-3, is that by slight deviations in the dimensional relationship of the pantograph linkages it is possible to generate a pattern of motion with the tip of the end effector working tool other than a round circle. By such deviations in design, within the geometric rules prescribed, it is possible to generate ovals, ellipses, kidney-shaped patterns and others in order to negotiate around very unusual shapes of parts being worked on. This can be achieved, for example, by making the dimensions C2-F somewhat different from dimension C1-B in FIGS. 1-3 or the dimensions C2-F,G different from C1-B,E in FIGS. 4 and 5, but otherwise in conformance with the prescribed geometric rules.

The geometric rules governing design and operation of the articulating wrist shown in FIGS. 4 and 5 are as follows:

Geometric Rules for FIGS. 4 and 5

1. R is arbitrary constant (3 places).
2. L is arbitrary constant (3 places).
3. Triangles C,B,E, & C2,G,F are congruent and must be in same orientation.
4. Triangles can be displaced one to the other within Rules 1 and 3.
5. C2 must be displaced from C1 in the x-y plane to provide mechanism stability.
6. For $\theta = 120°$, only one of pivots F & G is needed, but must be displaced to avoid an over center condition (links 19 and 21 change shape).
7. The triangles are isosceles for plus or minus $\theta$ action.
8. System can be canted with respect to x-z plane.
9. Motion rotates an element about a single center point, remote or extended away from the mechanism.
10. C1 and C2 rotations are synchronous; drive either, or both.

11. If C1 and C2 are locked together with one driver, G or F can be eliminated, but at the cost of strength and force.

Figure 6:
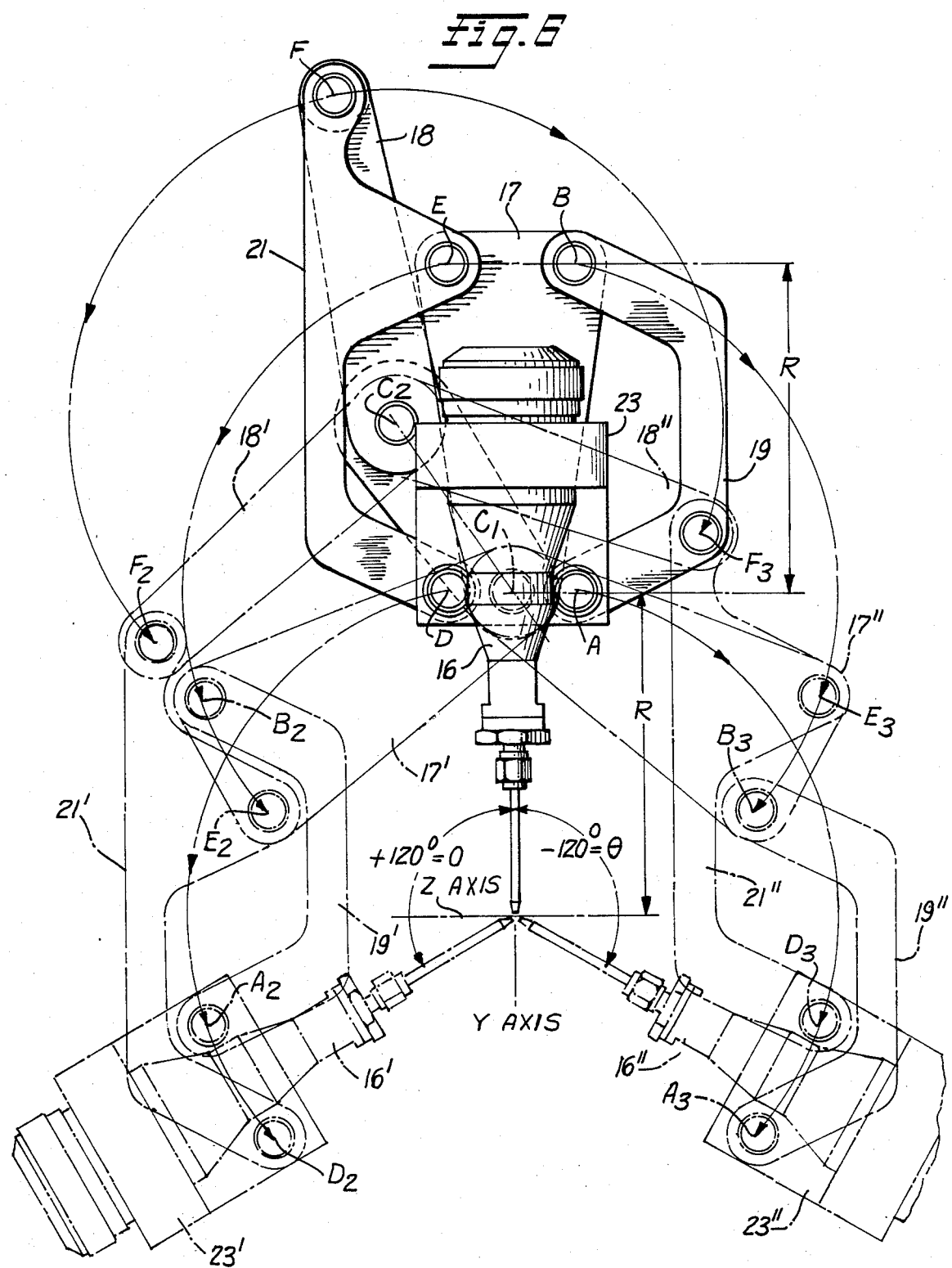
FIG. 6 is a top planar elevational view of still another embodiment of the invention which is somewhat similar to that shown in FIG. 4 but is simpler and lighter in construction than the embodiment of FIGS. 4 and 5.

FIGS. 6 and 7 of the drawings depict a modified form of the articulating wrist mechanism shown in FIGS. 4 and 5 wherein it is possible to lock the shafts C1 and C2 together and employ only a single drive. With this arrangement it is also possible to eliminate one of the pivot points either G or F without being threatened with an ambiguous over-center condition. In the embodiment shown in FIGS. 6 and 7, the pivot point G has been eliminated with a consequent reduction in the size and weight of the pantograph members 19 and 21 without too great a reduction in the load carrying capability of the mechanism. In this design, the pivot point F has been maintained so that the fixed pivot point C2 can be displaced for optimizing design configuration. The rule which must be followed is that a common center line through the fixed pivot point C1 and the rotatable pivot point E must be parallel to the center line between the fixed pivot point C2 and the rotatable pivot point F. The same argument would hold if it were desired to keep the pivot point G, only then it would be necessary to keep the common center line to C1 and B parallel to the common center line between C2 and G. It also follows that the center-to-center distances of the two elements, that is C1 to E and C2 to F must be equal and the same would be true for distances between C1 and B and C2 and G, if that design configuration were used. C2 and its driver link 18 (connecting C2 between pivot point F or G, if used) can be displaced in the x, y or z direction, providing that good design standards are practiced for maintaining strength and rigidity. The basic consideration to be observed is that the distance between C2 and either F or G must be equal to the distance between C1 and B or E. It should be further noted that locking the shafts C1 and C2 together is not necessary, provided that it is shaft C2 which is driven if there is only one pivot point such as F or G or some other axis the required distance from C2. Also the new point (such as F) in combination with C2 must define a parallelogram with the other two corners being C1 and E or C1 and B. In other words, it is necessary to adhere to the rule of providing a secondary restraining parallelogram-type pantograph. The result is to allow reshaping the primary pantograph links 19 and 21 so as to minimize their size and simplify their configuration. The embodiment of the invention shown in FIGS. 6 and 7 is a good example of this approach.

Figure 8:
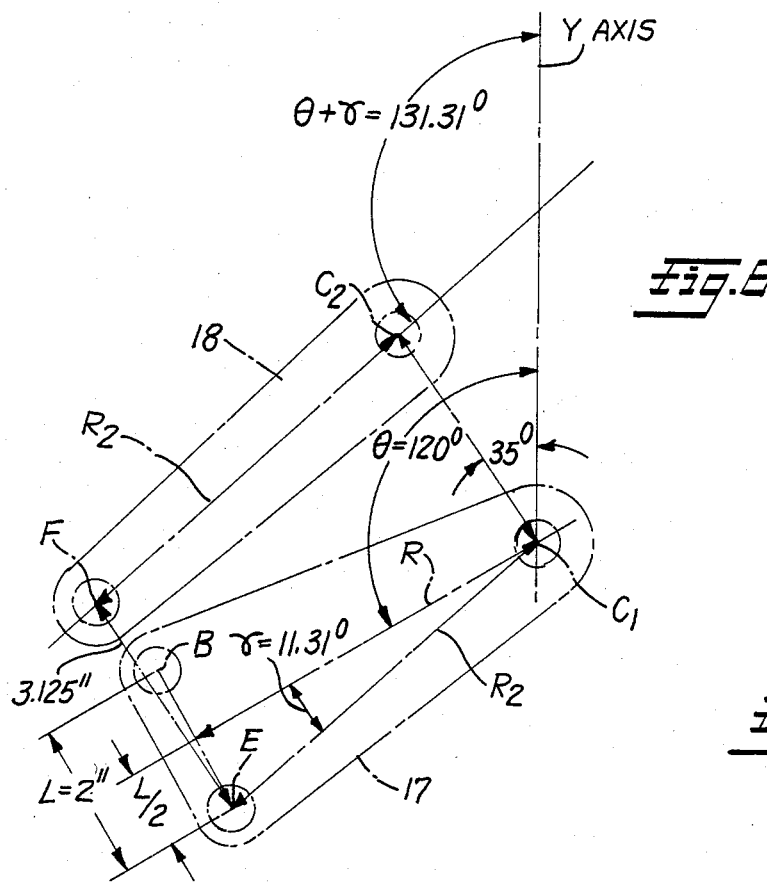
FIG. 8 is a diagramatic sketch illustrating the relationship of two of the coupling links employed in the pantograph mechanism comprising a part of the embodiment of the invention shown in FIGS. 6 and 7.

All geometric rules for design and engineering of the embodiment of the invention shown in FIGS. 6 and 7 are the same as those cited with respect to the FIGS. 4 and 5 species. The sketch shown in FIG. 8 illustrates the key parts 17 and 18 and their optimal dimensional relationships with the mechanism in the position where $\theta = +120°$. The geometry illustrates the parallelogram comprised by C1, C2, F and E. Here again the important constants are the parameters R and L as shown in FIGS. 6 and 7. As a result of this change in configuration of parts 17 and 18, the shape of parts 19 and 21 have been changed for optimization and because rotational axis F has been relocated and rotational axis G has been eliminated from the design shown in FIGS. 4 and 5. Consequently, all parts have been simplified to provide a more graceful contour and minimize protrusions near the nozzle or tip of the end effector working tool without too great a sacrifice in strength and force.

FIGS. 9 and 10 illustrate still another embodiment of an articulating and rotating wrist assembly according to the invention. The embodiment shown in FIGS. 9 and 10 is similar in many respects to the embodiment shown and described with relation to FIGS. 1-3 of the drawings. It differs however in the construction of the restraining means and the configuration of the primary pantograph link 19. In FIGS. 9 and 10 a sun gear 24 is secured to member 11 around fixed rotational axis C1, which in turn is driven thereby through the chain drive 22 and bevel gear arrangement 20C as described earlier with respect to FIGS. 1-3. Sun gear 24 meshes with idler gear 25 which is rotatably mounted on the member 17 about rotational axis H. Shaft C1 is fixed to link 17, and is free to rotate within sun gear 24. Sun gear 24 does not rotate. Link 17 drives idler 25 around sun gear 24. Idler gear 25 meshes with and drives a planet gear 26 also rotatably mounted on member 17 around rotational axis B. Obviously, the gear design could be rearranged so as to have gear 26 connected to and drive link 21 instead of link 19. In the FIGS. 9 and 10 embodiment, the sun and planet gears are of equal diameter and have equal numbers of teeth. As a result of this arrangement, the primary pantograph mechanism comprised by link members 19' and 21' when driven by member 17 due to rotation of shaft C1, will cause the end effector tool 16 to scribe a segment of a circle when it is articulated through the arc $\theta = 120°$ by the mechanism. Again, the mechanism readily can be caused to move through a complimentary arc of $\theta = -120°$, but for simplification of the drawings, movement in the $-120°$ direction has not been illustrated.

In operation, the articulating wrist mechanism of FIGS. 9 and 10 functions in the same manner as that of FIGS. 1-3. However, in the FIGS. 9 and 10 embodiment, the restraint pantograph is replaced by the sun, idler and planet gear assembly. The sun gear 24 is secured to wrist base member 11 and remains fixed in space in whatever location the wrist base member 11 is positioned by the automatic machine tool with which it is driven. The idler gear 25 is free to rotate about a shaft mounted on member 17. Idler gear 25 in turn transmits rotational motion to the planet gear 26 which rotates a shaft passing through and rotatably supported by member 17 but anchored to primary pantograph link 19. Thus, the gear train assembly provides for fixing the orientation of primary pantograph links 19 and 21 so that they are maintained parallel to each other and also parallel to some base reference line, namely axis y, in the example shown. In other respects, the embodiment shown in FIGS. 9 and 10 is constructed similar to and operates like the embodiment of the invention shown in FIGS. 1-3.

Figure 12:
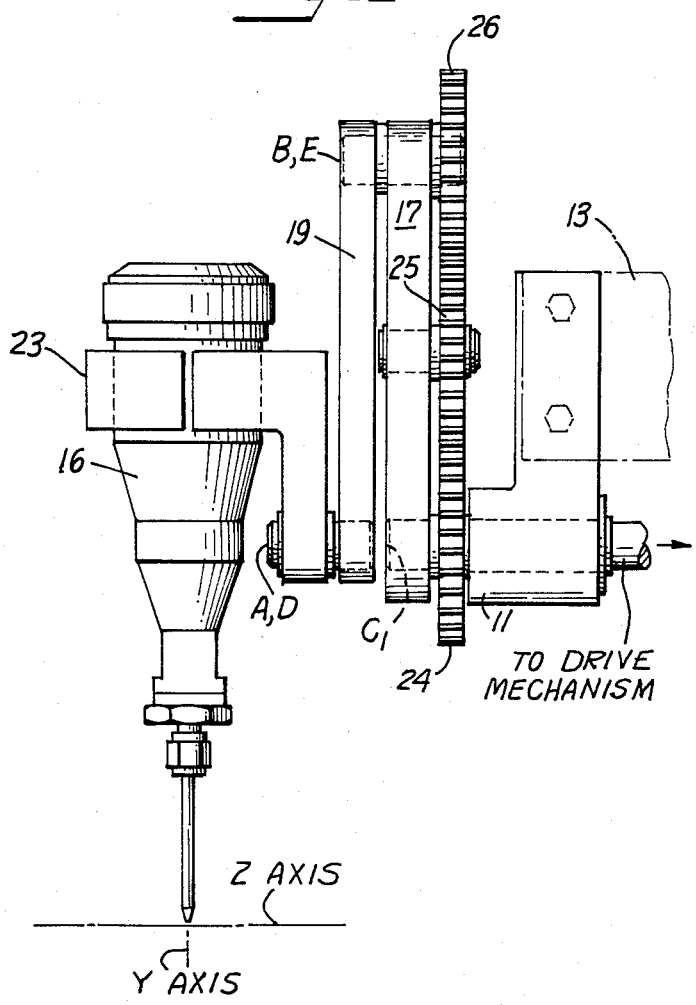
FIG. 12 is a side elevatonal view of the embodiment of the invention shown in FIG. 11.
Figure 11:
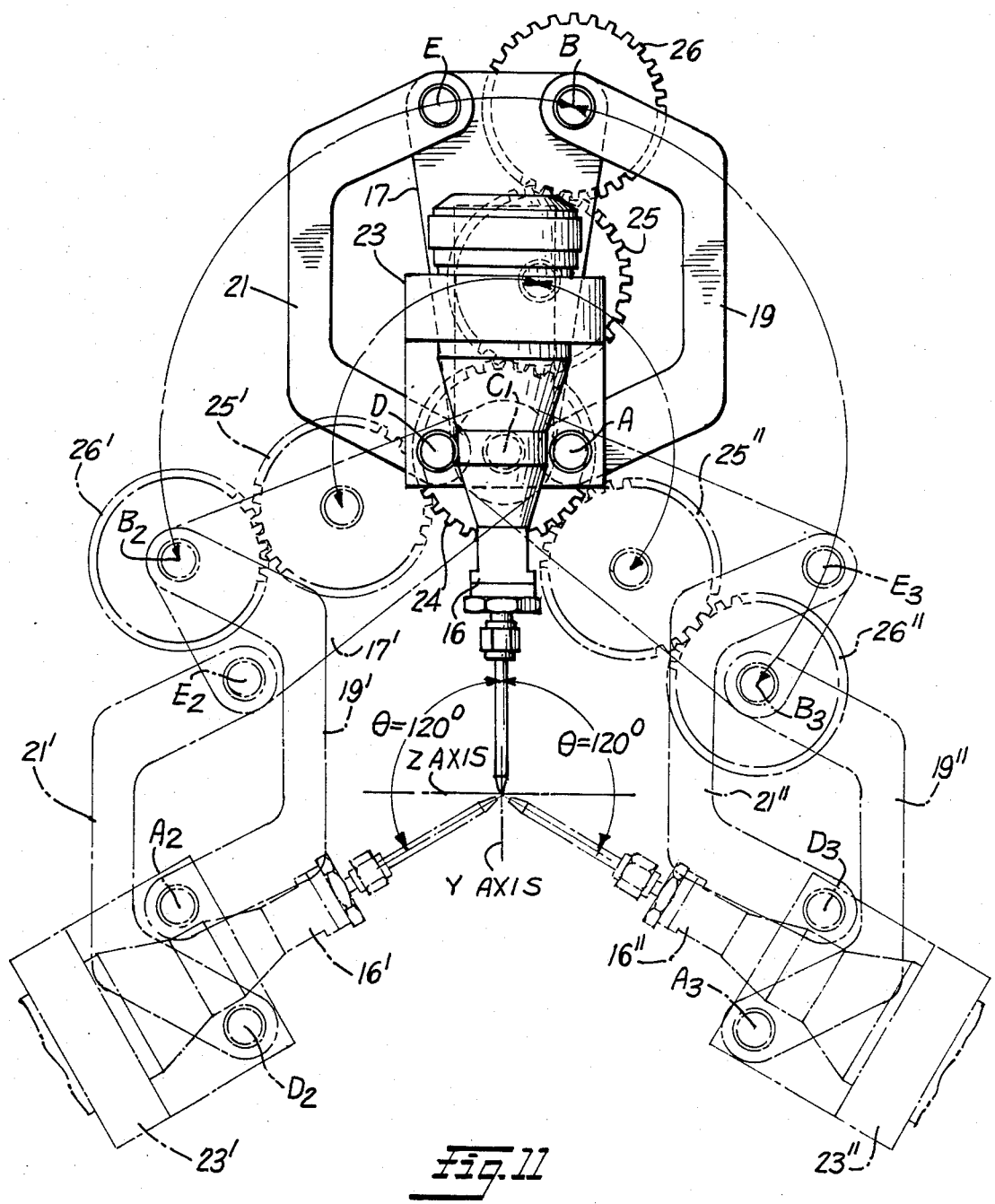
FIG. 11 is a top plan elevational view of still another form of the invention employing a sun, idler and planet gear assembly similar to the embodiment shown in FIGS. 9 and 10.

FIGS. 11 and 12 illustrate still another embodiment of the invention which is in many respects similar to the wrist shown in FIGS. 6-8 but differs therefrom, however, in that the secondary restraining pantograph has been replaced by an assembly of a sun, idler and planet gear as the restraining means for assuring proper articulation of the wrist. As best seen in FIG. 11, the triangular-shaped member 17 which is secured to and rotates with the rotatable shaft C1 further includes a sun gear 24 likewise keyed to shaft C1 as well as member 17 and rotatable therewith. Sun gear 24 meshes with and drives idler gear 25 which is rotatably supported on triangular member 17 and in turn meshes with and drives a planet gear 26. Planet gear 26 is rotatably supported on member 17 and rotates rotational axis B to which link 19 is fixed.

The primary parallelogram-type pantograph mechanism is comprised by links 19 and 21 which are essentially U-shaped in configuration. Link 19 has one end secured to rotational shaft B with the other end being rotatably secured to the mounting member 23 for the end effector tool 16. Primary pantograph link 21 likewise is U-shaped in configuration and thus is somewhat simpler than its counterpart in the FIG. 6 embodiment which requires an extended leg to support the additional rotational axis F. Link 21 has one end thereof secured to and driven by rotational axis E with the other end thereof rotatably supporting axis D to which the remaining side of the mounting member 23 for the end effector tool 16, is secured.

In operation, rotation of the main drive shaft C1 will cause member 17 to be rotated either positively or negatively through the arc $\theta = +$ or $-120°$, or to some intermediate position. By reason of the kinematics of the linkages, the end effector tool 16 will be driven through a corresponding arc about an axis which intersects the plane of movement of the articulating wrist but is displaced therefrom a predesigned distance depending upon the relative lengths of the linkages, etc. During this movement, the pivotal axes B and E and their corresponding displaced pivotal axes A and D will be constrained to move through and reproduce a segment of a circle by reason of the restraining action of the sun 24, idler 25 and planet 26 gear assembly.

In other respects, the embodiment of the invention shown in FIGS. 11 and 12 functions in a similar manner to that described with relation to FIGS. 6-8 and the geometric rules set down for that species are also applicable to the FIG. 11 and FIG. 12 embodiment of the invention. The desired rotational action takes place because the sun gear 24 is pinned to base member 11. Member 17 is driven by shaft C1. Idler gear is captured on part 17 so that it in turn will rotate about sun gear 24 and drive planet gear 26 which is pinned to and moves the primary pantograph link 19. The primary pantograph link 21 is rotationally supported on driver member 17 through rotational axis E so that the particular set of gear kinematics described, forces links 19 and 21 to remain parallel to each other and to a fixed reference axis in space, which happens to be the y axis in the embodiment shown in FIGS. 11 and 12. For this arrangement to work, the planet gear 26 is fixed to pantograph link 19 and its rotational drive shaft B is free to rotate within the driver member 17.

From the foregoing description it will be appreciated that the invention provides a novel articulating/articulating and rotating wrist mechanism which has the ability to rotate a point on an end effector tool about another point in space remote from the wrist mechanism. This is done in such a way that all of the operating mechanisms are remote from the point about which the end of the end effector tool is rotated so as provide the ability to reach into relatively inaccessible and hard to get to places defined generally by the unusual shape of a part being worked upon. For wrists where both the articulating and rotating motion is provided, through appropriate setting of the rotating and articulating wrist, and proper sequencing of the movements such that rotation occurs first followed by articulation through an arc $\theta < 90°$, it is possible to scribe a cone in the space with the tip or end of the working tool. The sequence of a full rotation followed by a stepped articulating motion through an arc $\theta < 90°$ will provide the very unusual and useful scribing action of a cone in space by the end of the end effector tool. The articulation and rotation essentially is all done with linkages and pivot points which make it a compact, light weight and inexpensive device. The heavy elements of motors, gears, sensors, which normally are required to be near the end effector tool, can be located back on the basis automatic machine tool drive mechanism thereby reducing weight at the end effector tool and the probability of undesired vibration of the working tool as it rapidly maneuvers through its required pattern of motion. While the particular embodiments described are used to trace segments of a circular arc about a remote axis in space removed from the wrist mechanism, by slight deviation of the pantograph linkage relationships as explained, it is possible to generate a pattern of motion with the tip of the working tool other than a rounded circle. For example, it is possible to generate ovals, ellipses, kidney-shaped patterns and the like in order to negotiate around very unusual shapes of parts being worked upon.

A review of the various embodiments of the invention described will reveal that the primary parallelogram-type pantograph that provides for the ability to rotate the end of an end effector tool about a fixed point in space which is remote from the wrist mechanism, is defined essentially by the axes A, B. D and E. This primary parallelogram-type pantograph is driven by one or more driver link members which are fixed to a drive shaft at either point C1 or C2, or both. The driver link member by its design requires that points B and E stay a fixed distances from each other and to scribe arcs of circles about either drive axis C1 or C2. Because conventional parallelogram pantograph devices have freedom for rotating the parallel links thereof about additional axes, such motion is undesirable and is prevented in the present invention by use of restraining means which is in the form of either a second parallelogram-type pantograph mechanism or a cluster of sun, idler or planet gears mounted on the driver link member. The restraining means thus comprised is designed such that it forces the two parallel links of the primary parllelogram-type pantograph mechanism 19 and 21 to maintain a fixed orientation with respect to the x-y axes. In other words, as shown in the drawings, the axes common to points A-B and points D-E are maintained parallel to the y axis at all times. With this combination of parallelogram-type linkages, the axis defined by B-E is forced to be restricted to pure rotation about the drive axis C1 or C2. As a result of the geometric rules governing the action of parallelograms, the axis defined between points A and D must duplicate the motions of the axis between points B and E, respectively. Therefore, points A and D which rotationally support the tool holder for the end effector tool 16 must duplicate the rotational motion of the axis between points B and E, respectively. Hence, points A and D must rotate about the intersection point of the x and y axes at a displaced point (R) from the axis C1, and is a duplication of the rotation of the axis between B and E about driver axis C1. For those embodiments of the invention where rotational freedom of movement also is provided as explained with relation to FIGS. 1-3, the rotational axes must intersect a driver axis C1 and the duplicated axis of rotation for the end of the end effector tool at some remote point in space displaced from the wrist mechanism within the same x-y plane of movement of the wrist mechanism.

In comparing the present invention to known wrist mechanisms for automatic machine tools, it is important to note that with the present invention, the end of the end effector tool is rotated about a selected axis at the remote end of the end effector tool both during articulation and rotation. In the known designs, translation of the end effector tool in space occurs along a single, two or three orthogonally arrayed axes but such designs are incapable of rotating the end of the tool about a displaced axis from the axis of rotation of the wrist mechanism itself as taught in the present invention.

The improved wrist according to the invention, because of its designed characristics can cause an end effector tool to articulate about a point in space displaced from the automatic machine tool which drives it without causing a divergence in the required pattern of motion on the part of the automatic machine tool which drives the wrist and end effector tool. For example, should the articulation provided by the wrist be a swing forward of the end effector tool, as the total automatic machine tool is moving in a forward direction, then to keep a constant speed or proper direction, known wrist mechanisms require that other base motions of the automatic machine tool be adjusted through computer control to compensate for the necessary secondary motion imparted by the requirement for articulation. The present invention obviates the need for these adjustments to the base motions of the automatic machine tool to compensate for movements of the articulating wrist.

INDUSTRIAL APPLICABILITY

The simple, low cost articulating/articulating and rotating wrist assembly made available by the present invention is designed for use on automatic machine tools to do manipulator work that does not require large load carrying capacity or the dexterity provided by a three dimensionally moving wrist. Applications for the wrist assembly of this invention include gas torch cutting, spray painting, welding, brazing, dispensing on mastic materials and possibly in the medical field for articulating a scanning x-ray gun about a target to be x-rayed, as well as others. The wrist assembly can be used in conjunction with the planar and/or three dimensional "SHAPEMAKER" manufactured and sold by Robotics, Inc. of Ballston Spa, New York, the assignee of this invention, or can be employed in conjunction with a numerical control machine, or other similar automatic machine tool for computer controlled automatic placement along only a single axis, or for two dimensional movement within an x-y plane, or for three dimensional placement of the wrist assembly in a working environment.

Having described several embodiments of a new and improved articulating/articulating and rotating wrist mechanism and automatic machine tool employing the same constructed in accordance with the invention, it is believed obvious that other modifications and variations of the invention will be suggested to those skilled in the art in the light of the above teachings. It is therefore to be understood that the changes may be made in the particular embodiments of the invention described which are within the full intended scope of the invention as defined by the appended claims.

What is claimed is:

1. An articulating wrist for an automatic machine tool having an automatically driven tool positioning member for automatically positioning and manipulating a working tool at a desired point in space, said wrist comprising tool holding means for holding an end effector tool, articulating means pivotally supporting said tool holding means at one end thereof for rotating the end effector tool through an arcuate path lying within an x-y plane of tool rotation at a point displaced from the axis of rotation of the articulating means, a base member, reversible drive shaft means rotatably supported on said base member, restraining means pivotally coupled to said articulating means and fixed to and driven by said reversible drive shaft means for kinematically rotating the articulating means in either direction from a neutral starting position about its axis of rotation along an arcuate path extending up to plus or minus 150 degrees from the starting position to thereby cause the end effector tool to reproduce about the displaced axis an extended arcuate path of rotation similar to that of the articulating means about its own axis of rotation, and said articulating means and restraining means being proportioned and arranged relative to each other to permit freedom of movement of the wrist mechanism in either direction from its neutral starting position.

2. An articulating and rotating wrist mechanism according to claim 1 further including means for rotating the base memeber and the articulating wrist mechanism supported thereon about either the y or x axis of movement thereof.

3. An articulating wrist mechanism according to claim 2 further including remote drive coupling means coupled between said reversible drive shaft means and controllable reversible drive motor means mounted on an automatic machine tool that supports the base member and said mechanism.

4. An articulating wrist according to claim 3 wherein the restraining means employs dimensionally equal parts whereby the end of the end effector tool is caused to scribe segmental arcs of a circle in its path of movement while being articulated.

5. An articulating wrist according to claim 3 wherein the restraining means employs dimensionally unequal parts whereby the end of the end effector tool is caused to scribe segmental arcs of figures other than a circle about the displaced axis in its path of movement while being articulated.

6. An articulating and rotating wrist according to claim 3 wherein the secondary restraining means comprises a cluster assembly of sun, idler and planet gears rotatably supported on a restraining member pivotally connected to one end of the articulating means other than that to which the end effector tool is secured with the sun gear being coaxial with said reversible drive shaft means and the planet gear being coaxial with and rotating a shaft that moves said articulating means.

7. An automatic machine tool providing for automatic placement of an end effector tool along a single axis, within an x-y plane or within a three dimensional space of movement and wherein an articulating and rotating wrist assembly according to claim 6 is mounted on the end of a movable tool placement member comprising a part of the automatic machine tool.

8. An articulating wrist mechanism according to claim 1 further including remote drive coupling means coupled between said reversible drive shaft means and controllable reversible drive motor means mounted on an automatic machine tool that supports the base member and said mechanism.

9. An articulating wrist according to claim 1 wherein the restraining means employs dimensionally equal parts whereby the end of the end effector tool is caused to scribe segmental arcs of a circle in its path of movement while being articulated.

10. An articulating wrist according to claim 1 wherein the restraining means employs dimensionally unequal parts whereby the end of the end effector tool is caused to scribe segmental arcs of figures other than a circle about the displaced axis in its path of movement while being articulated.

11. An articulating wrist according to claim 1 wherein the secondary restraining means comprises a cluster assembly of sun, idler and planet gears rotatably supported on a restraining member pivotally connected to an end of the articulating means other than that to which the end effector tool is secured with the sun gear being coaxial with said reversible drive shaft means and the planet gear being coaxial with and rotating a rotatable shaft that moves said articulating means.

12. A simple low cost articulating wrist for an automatic machine tool comprising a base member, a primary parallelogram-type pantograph mechanism supported on said base member and having an end effector tool pivotally supported at one end thereof for rotation in an x-y plane about a displaced axis that intersects the x-y plane of rotation of the primary pantograph mechanism at a point displaced from the axis of rotation of the pantograph mechanism, reversible drive shaft means rotatably supported on said base member, a secondary pantograph mechanism pivotally coupled to said primary pantograph mechanism at points remote from said tool holder and having at least one element fixed to said reversible drive shaft means and rotatable thereby for kinematically rotating the primary pantograph mechanism in either direction from a neutral starting postions about its axis of rotation along an arcuate path extending up to plus or minus 150 degrees from the starting position to thereby cause the end effector tool to reproduce about the displaced axis an arcuate path of rotation similar to that of the secondary pantograph mechansim about its own axis of rotation, and said pantograph mechanisms being proportioned and arranged relative to each other to permit freedom of movement of the wrist mechanism in either direction from its neutral starting position.

13. An articulating wrist according to claim 12 wherein the primary pantograph mechanism is comprised by two E-shaped members which in the neutral starting position lie in the same plane and are parallel to one another with the ends of the legs of the respective E-shaped members opposed to each other, the respective sets of opposed legs nesting within one another upon the wrist mechanism being rotated in either direction from its neutral starting position, and wherein the end effector tool is secured to a member rotatably mounted to the ends of respective opposed end legs of the two parallel E-shaped members of the primary pantograph mechanism, and said secondary pantograph mechanism being comprised by triangular-shaped members rotatably connected between respective opposed ends of the remaining sets of legs on the E-shaped members and a respective reversibly rotatably shaft on said body member with at lest one of the shafts being reversibly driven, said triangular-shaped members being laterally displaced relative to the E-shaped members and offset relative to each other to form a compact articulating wrist structure.

14. An articulating and rotating wrist according to claim 13 wherein said base member on which said primary pantograph mechanism is rotatably supported together with said reversible drive shaft means, said end effector tool and said secondary pantograph mechanism further includes means for rotating said base member about one of said x-y axes.

15. An articulating and rotating wrist according to claim 14 wherein the axis of rotation of said base member is coaxial with the end of the end effector tool.

16. An automatic machine tool providing for automatic placement of an end effector tool along a single axis, within an x-y plane or within a three dimensional space of movement and wherein an articulating and rotating wrist assembly according to claim 14 is mounted on the end of a movable tool placement member comprising a part of the automatic machine tool.

17. An articulating and rotating wrist according to claim 14 wherein the secondary pantograph mechanism employs dimensionally equal parts whereby the end of the end effector tool is caused to scribe segmental arcs of a circle in its path of movement while being articulated.

18. An articulating and rotating wrist according to claim 14 wherein the secondary pantograph mechanism employs dimensionally unequal parts whereby the end of the end effector tool is caused to scribe segmental arcs of figures other than a circle about the displaced axis in its path of movement while being articulated.

19. An automatic machine tool providing for automatic placement of an end effector tool along a single axis, within an x-y plane or within a three dimensional space of movement and wherein an articulating wrist assembly according to claim 13 is mounted on the end of a movable tool placement member comprising a part of the automatic machine tool.

20. An articulating and rotating wrist according to claim 12 wherein said base member on which said primary pantograph mechanism is rotatably supported together with said reversible drive shaft means, said end effector tool and said secondary pantograph mechanism further includes means for rotating said base member about one of said x-y axes.

21. An automatic machine tool providing for automatic placement of an end effector tool along a single axis, within an x-y plane or within a three dimensional space of movement and wherein an articulating wrist according to claim 12 is mounted on the end of a movable tool placement member comprising a part of the automatic machine tool.

22. An articulating wrist according to claim 12 wherein the secondary pantograph mechanism employs dimensionally equal parts whereby the end of the end effector tool is caused to scribe segmental arcs of a circle in its path of movement while being articulated.

23. An articulated wrist according to claim 12 wherein the secondary pantograph mechanism employs dimensionally unequal parts whereby the end of the end effector tool is caused to scribe segmental arcs of figures other than a circle about the displaced axis in its path of movement while being articulated.

24. The method of scribing a conical path of movement in space with the working end of an end effector tool with an articulating and rotating wrist for an automatic machine tool having an automatically driven tool positioning member for automatically positioning a working tool at a desired point in space along a single axis of movement, within a two dimensional plane or within a three dimensional space, said wrist comprising holding means for holding an end effector tool, articulating means supporting said holding means for rotating the end of the end effector tool through an arcuate path lying within an x-y plane about a displaced axis that intersects the x-y plane of rotation at a point displaced from the axis of rotation of the articulating means, drive shaft means coupled to said articulating means for rotating the articulating means about its said axis of rotation, restraining means coupled to said articulating means and to said drive shaft means for kinematically forcing the end of the end effector tool to exactly reproduce about the displaced axis the arcuate path of rotation of the articulating means about its own axis of rotation, and means for rotating the articulating wrist mechanism about either the y or x axis of movement thereof, and wherein the wrist is primarily rotated about either the x or y axis while being progressively articulated in an x-y plane about the z axis.

* * * * *